Oct. 11, 1932.  F. LEYVASTRE  1,882,022
STARTING MECHANISM FOR MOTOR VEHICLES
Filed May 31, 1930
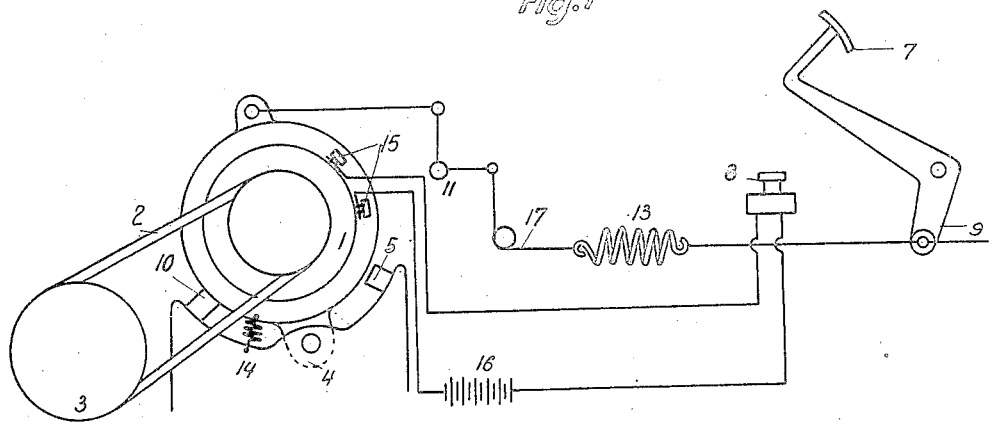
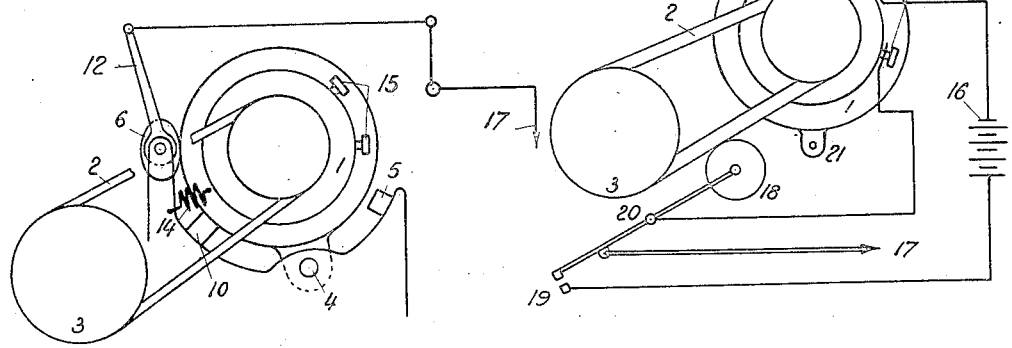
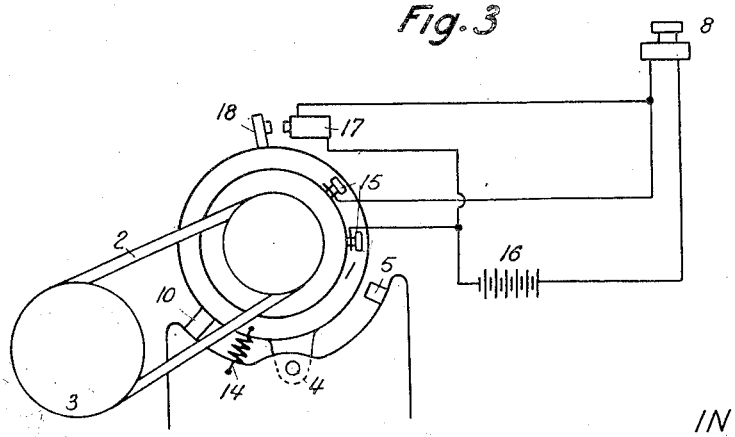
INVENTOR
Ferdinand LEYVASTRE
by
Attorney Patented Oct. 11, 1932

1,882,022

UNITED STATES PATENT OFFICE

FERDINAND LEYVASTRE, OF LYON, FRANCE, ASSIGNOR TO SOCIETE DE PARIS ET DU RHONE, OF LYON, FRANCE, A CORPORATION OF FRANCE

STARTING MECHANISM FOR MOTOR VEHICLES

Application filed May 31, 1930, Serial No. 457,687, and in France June 28, 1929.

This invention is for improvements in or relating to starting mechanism for motor vehicles and more particularly to starting mechanism of the type wherein the starting motor is combined with a generator.

In the electrical equipment of automobiles, it is becoming a universal practice to utilize a single electrical machine both as a motor for starting the engine of the automobile and as a generator for the production of electric current required for lighting and other purposes. A machine of this character arranged to act alternatively as a motor and as a generator is referred to in the following description as a "dynamotor".

The dynamotor may be coupled directly to the crank shaft of the internal combustion engine of the automobile or the dynamotor may be operatively connected to the said shaft by a belt transmission. With the belt transmission a relatively large turning moment is produced at the moment of starting the engine which often causes the belt to slip and render the dynamotor incapable of starting the engine. The belt must not be subjected to a too great a permanent tension because if the dynamotor is employed as a generator which has to be driven at a high speed, it will be subjected when it is employed as a motor for starting purposes, to excessive mechanical stresses due to the action of the tension of the belt.

The present invention has for its object to provide an improved system of belt transmission of the type referred to, and provides a system in which the tension of the said belt is increased exactly at the moment of starting and thereby prevents it slipping with relation to the pulley of the dynamotor and ensures a complete transmission of the turning moment. The increased tension is relieved as soon as the engine starts, so that while the dynamotor is working as a generator, it does not undergo any excessive mechanical stress as the belt is then under its normal tension.

In order that the invention may be fully understood, reference is directed to the accompanying drawing in which:—

Figure 1 illustrates diagrammatically mechanism embodying a preferred form of apparatus constructed in accordance with the invention.

Figure 2 illustrates a modified form of the apparatus shown in Figure 1,

Figure 3 is a diagrammatic view of a further modified form of apparatus, and

Figure 4 is a diagrammatic view of a still further modified form of apparatus.

Similar parts of the apparatus illustrated in the several figures of the drawing are indicated by the same reference numerals.

Referring to Figure 1 of the drawing, a dynamotor of an automobile is pivotally mounted at 4 to a fixed frame and a belt 2 is arranged to extend around both the pulley of the dynamotor and a pulley 3 provided upon the crank-shaft of the engine so as to establish a driving relationship between the said pulleys. A link mechanism 11 is operatively connected to the dynamotor so that when the engine is started the dynamotor is rocked slightly about the pivot 4 by an amount necessary to tension the belt 2 to a maximum degree compatible with the mechanical strength of the whole system.

After the engine has been started the link mechanism 11 is released and the dynamotor is automatically returned to the normal position under the action of a yielding control such, for example, as a spring 14, or under the tensile action of the belt alone so that the supplementary tension of the belt is released. Stops 5 and 10 are provided upon the aforesaid fixed frame to limit the rocking movement of the dynamotor and may, if necessary, be adjustable. The stop 5 prevents the belt 2 from being subjected to an excessive tension during the starting of the engine, and the stop 10 is arranged to limit the movement of the dynamotor in the opposite direction when the same is driven as a generator.

It is to be observed that means other than the link mechanism 11 may be employed for effecting the rocking of the dynamotor about the pivot 4, for example, a cable may be employed for this purpose.

The controlling link mechanism or cables are preferably so arranged that their actuation is effected by the operation of pedals or the like and means may be provided for effecting an adjustment in the length of the said links or cables such, for example, as a strainer comprising a threaded rod and nuts, spiral springs and the like. Further it is to be observed that the mechanical controlling member such for example as a pedal, is preferably combined with or operatively connected to a starting switch for the dynamotor.

Figure 1 illustrates a relatively simple construction of starting pedal, the depression of which is arranged to tension the belt of the dynamotor and effect the electrical connection of the dynamotor to the battery therefor. In Figure 1 a starting pedal 7 is arranged to be depressed initially when the engine is to be started so as to actuate a lever extension 9 thereof operatively connected by a cable 17 to the dynamotor 1 so as to control the movement thereof about the pivot 4. Upon the application of further pressure upon the pedal 7 a spring 13 provided between the lever 9 and the dynamotor permits the continued movement of the pedal into engagement with a contact device 8 which thereby closes the circuit of the motor by connecting the terminal 15 of the dynamotor electrically with the battery 16. The starting of the engine is thus effected with the belt tensioned to a predetermined extent.

Referring to Figure 2 an apparatus is illustrated wherein the movement of the dynamotor 1 is effected by the operation of a cam 6 which is pivotally mounted to the fixed frame upon which the dynamotor is mounted and is operable to be moved about its axis through the medium of a lever 12 connected at one end to the said cam and at the free end of the said lever thereof to link mechanism similar to the mechanism 11 illustrated in Figure 1. When the cam 6 is rotated by an operation of the link mechanism the dynamotor is rocked about its pivot 4 in a manner similar to that described with reference to Figure 1.

Figure 3 illustrates an arrangement in which the belt 2 is arranged to be tensioned by an electro-magnetically actuated mechanism. An armature 18 of an electro-magnet 17 is rigidly secured to the dynamotor 1 and is arranged to be attracted by the electromagnet 17 when the same is energized upon the engine being started. An initial depression of a starting button 8 establishes a circuit which includes a battery 16 and the winding of the electromagnet 17 which is thereby energized and attracts the armature 18 to displace the dynamotor in a direction which increases the tension of the belt 2. Application of further pressure upon the button 8 is arranged to close an additional circuit which includes the battery 16, the terminals 15 and windings of the dynamotor, so that the starting of the engine is effected with the belt 2 tensioned to a predetermined extent.

It is to be understood that the supplementary tension of the belt 2 at the moment of starting the engine of the automobile may also be applied by means of mechanism arranged to apply tension directly to the belt and which may be controlled in a similar manner to the apparatus above described.

Figure 4 illustrates such an embodiment wherein the dynamotor 1 is secured in a fixed position by means of lugs 21 and a jockey pulley 18 carried by an arm pivotally mounted at 20 and connected by a cable 17 to a control pedal similar to that illustrated in Figure 1. An initial operative movement of the cable 17 causes the pulley 18 to be pressed into engagement with the belt 2 to increase the tension thereof. A further movement of the cable 17 causes a pair of electrical contacts 19, to be closed, the movable contact of which is carried upon the arm of the pulley 18. An electrical circuit is thereby closed which includes the battery 16 and the winding of the dynamotor. The starting of the engine is thereupon effected as in the preceding examples with the belt 2 tensioned to the required degree.

I claim:

1. A method of operating a self-starter apparatus for starting an internal combustion engine, of the type comprising an electric starter motor-generator operatively connected to the internal combustion engine by means of a transmission belt which is normally under a predetermined operative tension for transmitting torque from the engine, which method consists in temporarily increasing the tension of the belt above the said predetermined value when torque is to be transmitted from the motor-generator, such increase of tension in the belt being applied prior to the commencement of operation of the motor-generator.

2. In a self-starter apparatus for starting an internal combustion engine, the combination, for carrying into effect the method claimed in claim 1, comprising an electric starter motor-generator, a transmission belt for operatively connecting the motor-generator to the internal combustion engine, which belt is normally under a predetermined operative tension for transmitting torque from the engine, a device for temporarily increasing the tension of the belt above the said predetermined value when torque is to be transmitted from the motor-generator, a switch for controlling the motor-circuit of the motor-generator and means for ensuring that, in closing said motor-circuit and applying the temporary increase of tension to the transmission belt, the belt tensioning device shall be brought into operation prior to the actuation of the motor-circuit switch.

3. In a self-starter apparatus for starting an internal combustion engine, the combination, for carrying into effect the method claimed in claim 1, comprising an electric starter motor-generator, a transmission belt for operatively connecting the motor-generator to the internal combustion engine, which belt is normally under a predetermined operative tension for transmitting torque from the engine, a device for temporarily increasing the tension of the belt above the said predetermined value when torque is to be transmitted from the motor-generator, a switch for controlling the motor-circuit of the motor-generator, actuating means for said switch, control-means for the belt tensioning device, and means interconnecting said actuating means and control means in such a manner that the latter of these means is brought into operation prior to the former.

4. In a self-starter apparatus for starting an internal combustion engine, the combination, for carrying into effect the method claimed in claim 1, comprising an electric starter motor-generator, a transmission belt for operatively connecting the motor-generator to the internal combustion engine, which belt is normally under a predetermined operative tension for transmitting torque from the engine, a device for temporarily increasing the tension of the belt above the said predetermined value when torque is to be transmitted from the motor-generator, a switch for controlling the motor-circuit of the motor-generator, actuating means for said switch, control-means for the belt tensioning device, means interconnecting said actuating means and control-means in such a manner that the latter of these means is brought into operation prior to the former, and yielding-control means to return said switch actuating means and belt tensioning device control-means to their normal inoperative positions.

5. Apparatus for starting an internal combustion engine having a crank shaft, which comprises in combination a combined electrical generator and motor having a spindle, a belt arranged to transmit movement of the spindle of the said motor to the crank shaft of the engine, means for moving said spindle from a normal position relative to the said crank shaft of the engine prior to the energizing of said motor and means for returning the said spindle to the normal position when the machine is to be employed as a generator.

6. Apparatus for starting an internal combustion engine having a crank shaft, which comprises in combination a combined electrical generator and motor having a spindle, a belt normally under a predetermined tension arranged to transmit rotational movement of the spindle of said motor to the crank shaft of the engine, means for increasing said tension prior to the energization of the said motor and means for releasing the said tension.

7. Apparatus for starting an internal combustion engine having a crank shaft, which comprises in combination a combined electrical generator and motor having a spindle, a belt arranged to transmit rotational movement of the spindle of said motor to the crank shaft of the engine, and independently mounted means connected to the said motor operable to move the same relatively to the said crank shaft so as to first vary the tension of the belt and subsequently actuate means which are arranged to establish an electrical circuit for said motor.

8. Apparatus for starting an internal combustion engine having a crank shaft, which comprises in combination a combined electrical generator and motor having a spindle, a belt arranged to transmit rotational movement of the spindle of the said motor to the crank shaft of the engine, means connected to the said motor operable to move the same relatively to the said crank shaft so as to vary the tension of the belt and thereafter actuate means arranged to establish an electrical circuit for the motor, and means operable to return the said motor to normal position and open the said circuit.

9. Apparatus for starting an internal combustion engine having a crank shaft, which comprises in combination a combined electrical generator and motor having a spindle, a belt normally under a predetermined tension arranged to transmit rotational movement of the spindle of said motor to the crank shaft of the engine, mechanism operatively connected to said motor an initial operation of which is adapted to move said motor relatively to said crank shaft so as to subject the said belt to a supplementary tension and a further operation of which is arranged to operate a contact device so as to close a circuit for the said motor.

10. Apparatus for starting an internal combustion engine having a crank shaft, which comprises in combination a combined electrical generator and motor having a spindle, a belt normally under a predetermined tension arranged to transmit rotational movement of the spindle of the said motor to the crank shaft of the engine, mechanism operatively connected to said motor an initial operation of which is adapted to move said motor relatively to the crank shaft so as to subject the said belt to a supplementary tension and a further operation of which is arranged to operate a contact device so as to close a circuit for the said motor, and means for opening said circuit and removing said supplementary tension.

11. Apparatus for starting an internal combustion engine having a crank shaft, which comprises in combination an electrical machine having a spindle, a belt arranged to transmit rotational movement of the spindle of the said machine to the crank shaft of the engine, a support secured to said machine arranged to carry the said machine in pivotal relationship to said engine, a mechanical system operatively connected to the said support and arranged to control the pivotal movement of the machine, and an independently pivoted operating pedal operable at will arranged to effect the operation of said mechanical system.

12. Apparatus for starting an internal combustion engine having a crank shaft, which comprises in combination an electrical machine having a spindle, a belt arranged to transmit rotational movement of the spindle of the said machine to the crank shaft of the engine, a support secured to said machine arranged to carry the said machine in pivotal relationship to said engine, a mechanical system arranged to control the pivotal movement of said machine, an independently pivoted operating pedal operable at will connected to said mechanical system, and means for esablishing an electric circuit for the said electric machine upon the actuation of the said pedal.

FERDINAND LEYVASTRE.